United States Patent [19]
Adams

[11] Patent Number: 5,194,164
[45] Date of Patent: Mar. 16, 1993

[54] INCLINED-PLANE OIL SKIMMERS

[76] Inventor: George W. Adams, 23 Huntingtown Road, Newtown, Conn. 06470-2626

[21] Appl. No.: 664,384

[22] Filed: Mar. 4, 1991

[51] Int. Cl.⁵ .............................................. E02B 15/04
[52] U.S. Cl. .................................. 210/776; 210/242.3; 210/923
[58] Field of Search ...................... 210/242.3, 776, 923, 210/541

[56] References Cited

U.S. PATENT DOCUMENTS

| | | | |
|---|---|---|---|
| 3,314,540 | 4/1967 | Lane | 210/923 |
| 3,615,017 | 10/1971 | Valdespino | 210/242.3 |
| 3,623,609 | 11/1971 | Ainlay | 210/923 |
| 3,715,034 | 2/1973 | Ivanoff | 210/923 |
| 3,860,519 | 1/1975 | Weatherford | 210/242.3 |
| 3,966,615 | 6/1976 | Petchul et al. | 210/923 |
| 4,265,757 | 5/1981 | Ivanoff | 210/923 |
| 4,305,810 | 12/1981 | Shimura | 210/923 |
| 4,426,288 | 1/1984 | Münte | 210/923 |
| 5,022,987 | 5/1991 | Wells | 210/923 |

Primary Examiner—Stanley S. Silverman
Assistant Examiner—Christopher Upton
Attorney, Agent, or Firm—F. Eugene Davis, IV

[57] ABSTRACT

A tranverse body is positioned underwater forward of the bow for reducing the surface wave caused by the bow and for increasing the fluid velocity at the forward surface of the bow. The body may be a cylinder, or a lifting body foil, the axis of which is generally parallel to the water surface, bow interface and may be supplied with winglets extending upwardly and inwardly at the edges thereof to form a body similar to a manta ray. The thickness of the body may vary transversely along it so as to counteract the transversely varying surface wave at the bow of the skimmer.

14 Claims, 3 Drawing Sheets

FIG.6
FIG.8
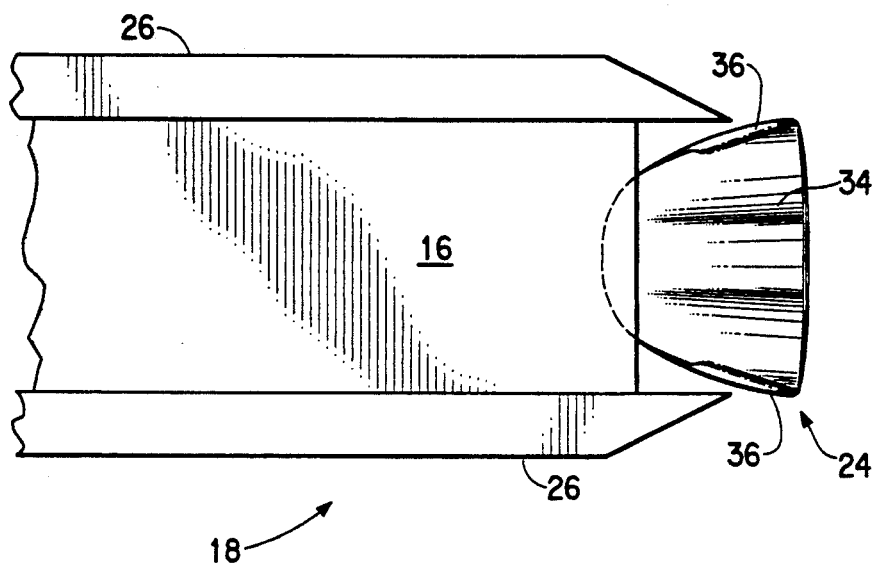
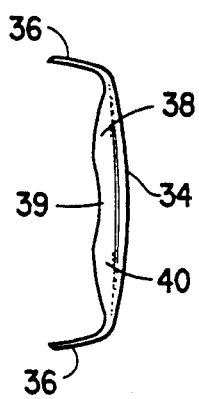
FIG.7
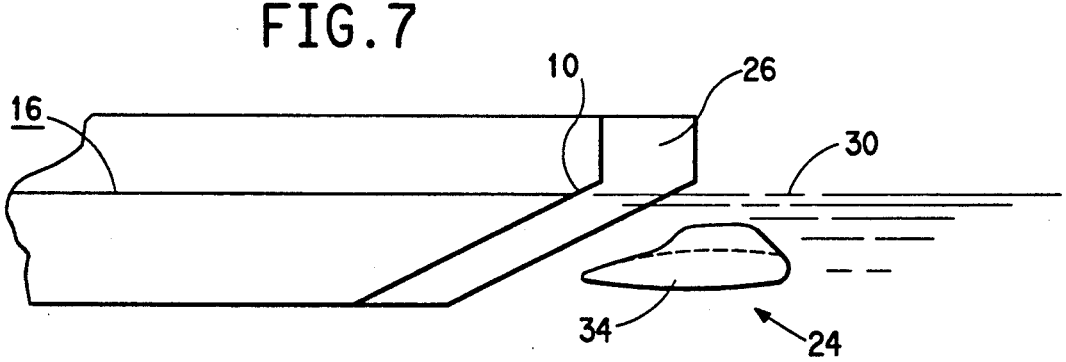

INCLINED-PLANE OIL SKIMMERS

TECHNICAL FIELD

This invention relates to improvements in inclined-plane oil skimmers. More particularly, it relates to improvements in oil skimmers disclosed in U.S. Pat. No. 3,715,034.

BACKGROUND ART

This invention comprises improvements in the oil skimmers disclosed in U.S. Pat. No. 3,715,034, Issued: Feb. 6, 1973 to A. Ivanoff entitled DEVICE FOR REMOVING OIL SLICKS. According to the above-identified patent "oil floating on a body of water is collected by moving a shallow-draft water craft, such as a barge, having a sternwardly slanted bow section and below the water line an ingress opening in or near the bow section through an oil slick. The slant of the bow section forces oil in its path downwardly thereby causing the oil, possibly intermingled with water, to flow as a flat layer along the bottom of the barge. As the oil reaches the ingress opening it is propelled into a hold of the barge due to the pressure differential between the outside and the inside of the barge. Oil thus accumulating in a hold of the barge may be removed therefrom from time to time and clear water as may also enter the hold is returned to the body of water."

The effectiveness of skimmers, according to the above-identified patent, decreases as the velocity between the skimmer and the water surface increases. This is due to the bow wave created by the inclined-plane which tends to collect oil in front of the bow wave and also to reduce the velocity of the oil relative to the surface of the inclined-plane to the point where the oil does not go down it for collection.

DISCLOSURE OF THE INVENTION

I have discovered that by positioning a transverse body ahead of the bow, water surface interface and below the surface of the water a surface wave may be created which is out of phase with the surface wave created by the inclined-plane and destructively interferes with it. This body can also increase the fluid velocity at the forward surface of the inclined-plane. The simplest body that produces these results is a cylinder, the axis of which is generally parallel to the water surface, bow interface. A better form is a foil-lifting body. The foil-lifting body may be extended rearwardly toward the water surface, bow interface and may be extended upwardly in winglets at the outer edges thereof. The winglets also extend inwardly to guide oil to the inclined-plane which would otherwise be pushed aside by the bow wave.

OBJECTS OF THE INVENTION

It is therefore an object of the invention to improve inclined-plane oil skimmers.

Another object of the invention is to increase the velocity with which such oil skimmers may operate effectively.

A further object of the invention is to reduce the amount of oil which is pushed to the sides of skimmers of the above character.

Other objects of the invention will in part be obvious and will in part appear hereinafter.

The invention accordingly comprises the features of construction, combinations of elements, and arrangements of parts which will be exemplified in the constructions hereinafter set forth.

The scope of the invention will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIG. 6 is a partial top view similar to FIG. 2 of another embodiment of my invention;

FIG. 7 is a side view thereof; and,

FIG. 8 is a front view thereof.

The same reference characters refer to the same elements throughout the several views of the drawings.

BEST MODE FOR CARRYING OUT THE INVENTION

Figure 1:
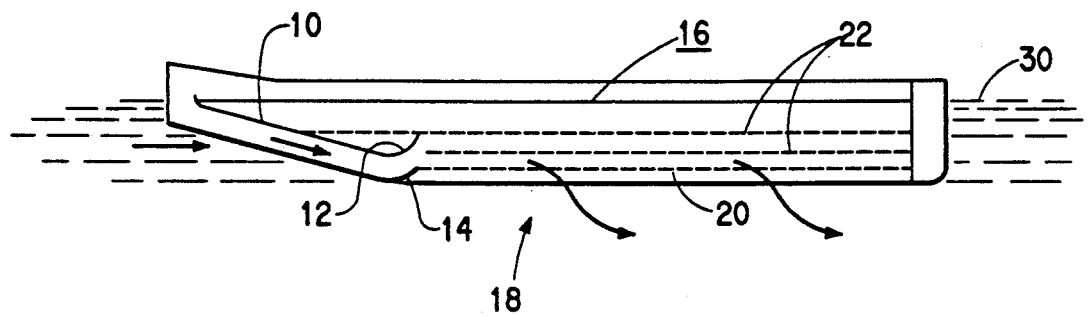
FIG. 1 is a cross-sectional view of an oil skimmer according to the prior art.

The oil skimmer 18, according the above-identified patent, comprises an inclined-plane 10 which pushes oil and some water downwardly as the skimmer travels towards the left, as shown in FIG. 1.

The oil enters the skimmer between the bow tail curve 12 and the adjustable vane 14 where it collects under the surface 16 of the oil and water in the skimmer 18. The skimmer has a perforated bottom 20 through which water leaves the skimmer and may employ baffles shown at 22.

The skimmer 18 may take the form of large boats or barges such as those manufactured by LPI Corporation, P.O. Box 113, Denville, N.J. 07834.

Figure 2:
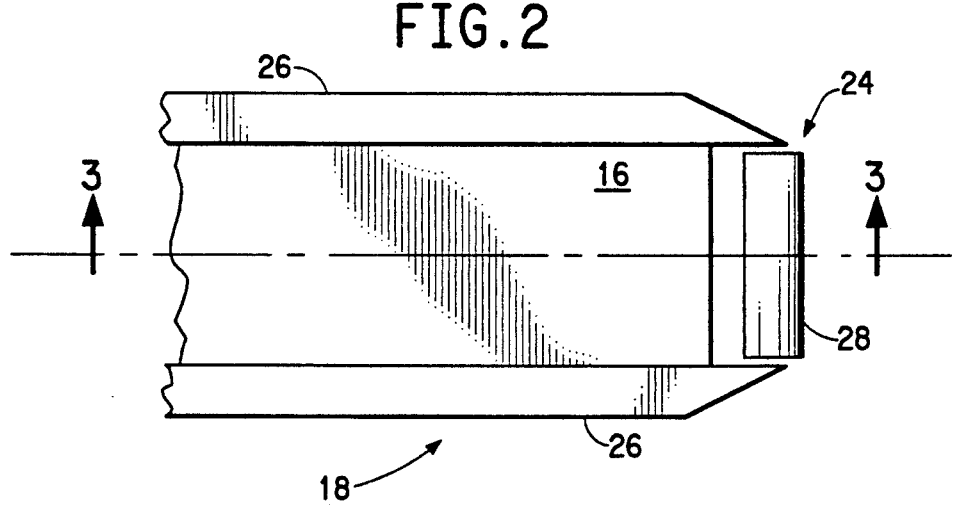
FIG. 2 is a partial top view of an oil skimmer according to FIG. 1 modified with my invention.
Figure 3:
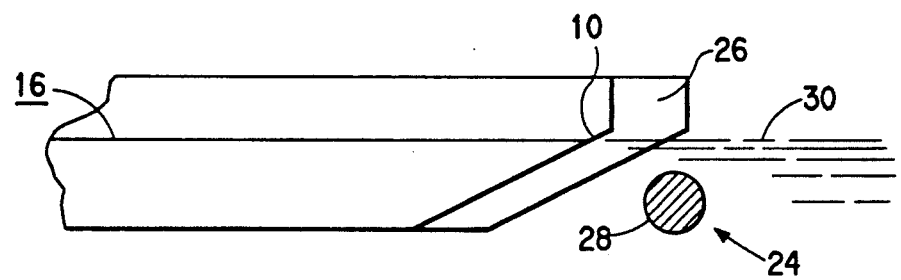
FIG. 3 is cross-sectional view taken along the line 3—3 of FIG. 2.

Now referring to FIG. 2, according to my invention, I place a transverse body, generally indicated at 24, under water ahead of the skimmer 18 and ahead of the inclined-plane 10. The body 24 may be mounted to the buoyant portions 26,26 of the skimmer 18 by means which are not shown and may extend between the buoyant portions 26,26 or extend beyond them as desired. As shown in FIGS. 2 and 3, the body 24 takes the form of a cylinder 28 which is located below the water surface 30 and ahead of the water surface, incline-plane interface. The axis of the cylinder 28 is parallel to the intersection of the inclined-plane 10 and the water surface 30.

Figure 4:
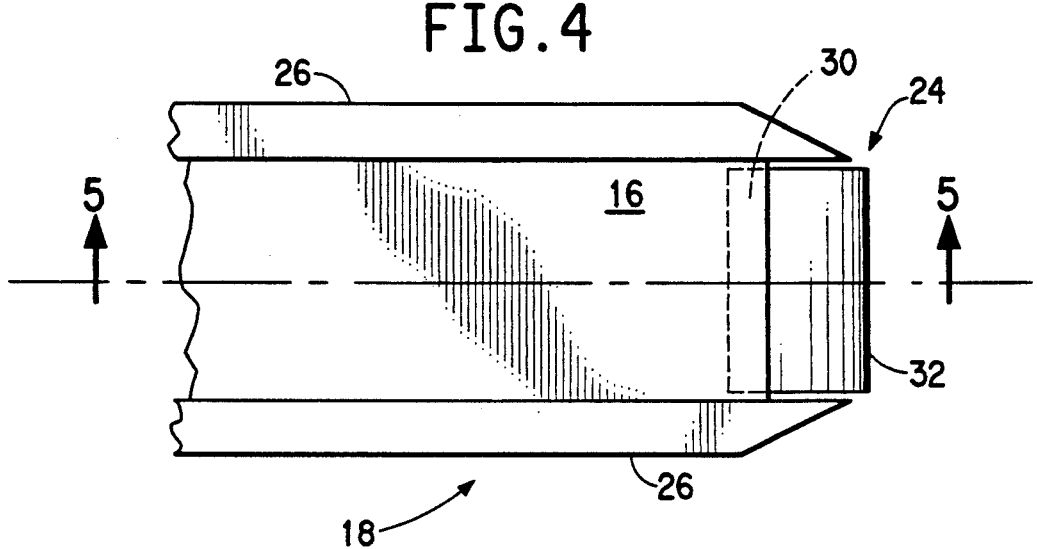
FIG. 4 is a partial top view similar to FIG. 2, of another embodiment of my invention.
Figure 5:
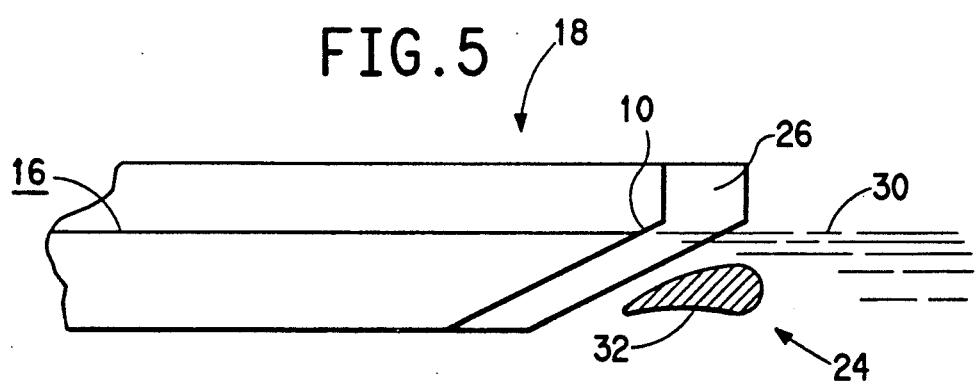
FIG. 5 is a cross-sectional view taken along the line 5—5 of FIG. 4.

Alternatively, as shown in FIGS. 4 and 5, the body generally indicated at 24, may take the form of a foil lifting body 32, again located below the water line 30 and ahead of the inclined-plane water interface.

A further modification of the invention is shown in FIGS. 6 and 7. Here the body 24 is a manta ray-like element 34 which has an elongated foil section in the middle thereof terminating in a pair of winglets 36,36 which extend upward and inwardly towards the inclined-plane 10. Here the foil surface has been extended considerably and the device 34 looks like a manta ray. The foil section of the device 34 may vary in thickness as at 38, 39, and 40 in conformity to the variation in the bow wave created by the skimmer 18. The cylinder and foil embodiments of the invention illustrated in FIGS. 2 through 5 has been tested in a scale model 17½ inches in length and having a transverse interior dimension where the inclined-plane 10 meets the water surface of 5 inches. In the case of the cylinder illustrated in FIGS. 2 and 3, the center line of the cylinder was located 1.1 inches below the water surface 30 and a horizontal distance ahead of the intersection of the water surface 30 and the inclinded-plane 10 of 1.75 inches. This model conforms to an actual full-size skimmer which is 35 feet long, has a interior dimension of 10 feet, and a cylinder 2 feet in diameter. The axis of the cylinder is 2.2 feet below the water surface and the horizontal distance in between the water surface inclined-plane interface and the axis of the cylinder is 3.5 feet.

It is believed that this device operates by generating a surface wave that interferes destructively with the bow surface wave of the skimmer.

The model of the foil embodiment of the invention illustrated in FIGS. 4 and 5 utilized a NACA 00050 foil section which was 1 inch thick from top to bottom and had a cord length of 2 inches and an attack angle of 7° above horizontal. The point on the cord 0.30 aft of the leading edge of the foil 32 was located in the same position as the axis of the cylinder of FIGS. 2 and 3, that is 1.1 inches below the water surface and 1.75 inches forward of the water surface inclined-plane interface, again conforming to a full-size skimmer 35 feet in length, 10 feet in interior width, a foil having a thickness of 2 feet, a cord length of 4 feet, with a point 0.30 aft of the leading edge being located 2.2 feet below the water surface and 3.5 feet ahead of the water inclined-plane intersection. In all of these cases, the inclined-plane angle is approximately 20°. The model was operated at a velocity of 1.6 feet per second which corresponds to a full-size skimmer traveling at 4.7 knots.

In the case of the foil embodiment of FIGS. 4 and 5, and the manta ray of FIGS. 6 through 8, the foil generates a circulation field around the body itself which field increases the fluid velocity at the forward surface of the inclined-plane.

In all embodiments, illustrated in FIGS. 2 through 8, the body 24 forces a fluid convergence between the body and the forward surface of the inclined-plane, which convergence increases the fluid velocity at the forward surface of the inclined plane.

The embodiment illustrated in FIGS. 6 and 7, which looks like a manta ray, has not been tested, but it is believed that it will not only accomplish the above results of the embodiments illustrated in FIGS. 2 through 5, but will improve them due to the elongation of the foil along the direction of motion of the skimmer 18 and the transversely varying thickness of the foil which is designed to destructively interfere with the transversely varying form of the bow wave formed by the inclined-plane 10. Additionally, the foil-shaped winglets 36 will cause a circular flow tending to bring oil into the skimmer from the edges and/or prevent oil from escaping from the edges as occurs when the body 24 is present.

The thicker foil sections 38 and 40 increase the amplitude and wave-length of the surface wave produced by the device and thus may be used to vary the amplitude and longitude of the wave to more closely interfere destructively with the skimmer bow wave pattern.

Those skilled in the art will understand that the cylinder and foil embodiments of FIGS. 2 through 5 may also employ winglets as shown in FIGS. 6 through 8 to draw water from the sides into the skimmer and vary in transverse thickness to generate the correct form of surface wave.

The invention provides the following advantages over the prior art:

1. A reduction in longitudinal extent of the pool of relatively still fluid immediately at the bow of the skimmer; or 2. A reduction in the upward slope of the fluid immediately at the bow of the skimmer; or 3. A reduction in the wave-induced splashing immediately at the bow of the skimmer, which tends to drive the fluid to be skimmed away from the skimmer; or 4. A reduction in the tendency of the bow wave to drive the fluid to be skimmed transversely away from the capture zone of the inclined-plane; or 5. An increase in the effective capture zone of the inclined-plane beyond its geometric width, or 6. An increase in the effective operating speed of the skimmer; or 7. Various combinations of the above.

It will thus be seen that the objects set forth above, among those made apparent from the preceding description, are efficiently attained, and said certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic, and specific features of the invention herein described and all statements of the scope of the invention of which, as a matter of language, might be said to fall therebetween.

Having described my invention what I claim as new and desire to secure by Letters Patent is:

1. In an oil skimmer comprising a hull for floating on a water surface and comprising a bow, a stern, and a hold within said hull for containing oil, said bow comprising an inclined surface extending from above said water surface downwardly and rearwardly through said water surface toward said stern and terminating in an opening into said hold, the improvement comprising:
   a foil lifting body under said water surface, ahead of said inclined surface, extending transverse to a center line of said skimmer drawn from bow to stern,
   the direction of lift of said body being directed toward said water surface and said foil lifting body being shaped such that in crosssection it is thinner in the vertical direction than in the horizontal direction and oriented such that the drag of said foil lifting body is minimized.

2. An oil skinner as defined in claim 1 wherein said foil lifting body is positioned such that is reduces the surface wave caused by said hull when said hull it is moving through said water surface.

3. An oil skinner as defined in claim 1 wherein said foil lifting body is positioned such that it increases the fluid velocity downward and rearward along said inclined surface when said hull is moving through said water surface.

4. An oil skinner as defined in claim 1 wherein said foil lifting body is positioned such that it reduces the surface wave caused by said hull and increases the fluid velocity downward and rearward along said inclined surface when said hull is moving through said water surface.

5. The oil skimmer defined in claim 1 wherein said foil lifting body comprises winglets extending upwardly and inwardly at the ends of said body away from said center line.

6. The oil skimmer defined in claim 5 wherein said foil lifting body extends longitudinally for a greater distance along said center line that it does near said ends.

7. The oil skimmer defined in claim 5 wherein said winglets are constructed and arranged such that said winglets produce a lift force directed inward toward said center line.

8. The skimmer defined in claim 1 wherein the vertical thickness of said foil lifting body varies across the length thereof.

9. The skimmer defined in claim 8 wherein said foil lifting body is thickest between its center and ends.

10. The method of improving the performance of an oil skimmer comprising a hull for floating on a water surface and comprising a bow, a stern, and a hold within said hull for containing oil, said bow comprising an inclined surface extending from above said water surface downwardly and rearwardly through said water surface toward said stern and terminating in an opening into said hold, said method comprising:

placing a cylindrical body under said water surface, ahead of said inclined surface, extending transverse to a center line of said skimmer drawn from bow to stern, said body not being rotationally driven and being attached to said skimmer, completely surrounded by water except where it is attached to said skimmer, and positioned ahead of said inclined surface such that it reduces the surface wave caused by said inclined surface when it is moving through said water surface.

11. The method defined in claim 10 wherein said body is fixed against rotation thereof.

12. The method of improving the performance of an oil skimmer comprising a hull for floating on a water surface and comprising a bow, a stern, and a hold within said hull for containing oil, said bow comprising an inclined surface extending from above said water surface downwardly and rearwardly through said water surface toward said stern and terminating in an opening into said hold, said method comprising:

placing a cylindrical body under said water surface, ahead of said inclined surface, extending transverse to a center line of said skimmer drawn from bow to stern, said body not being rotationally driven and being attached to said skimmer, completely surrounded by water except where it is attached to said skimmer, and positioned ahead of said inclined surface such that it increases the fluid velocity at said inclined surface when it is moving through said water surface.

13. The method defined in claim 12 wherein said body is fixed against rotation thereof.

14. The method defined in claim 12 wherein said cylindrical body is positioned such that it reduces the surface wave caused by said inclined surface when it is moving through said water surface.

* * * * *